(12) United States Patent
Chandran et al.

(10) Patent No.: US 7,344,019 B2
(45) Date of Patent: Mar. 18, 2008

(54) BORON COATED STAINLESS STEEL WIRE BELT ASSEMBLY

(75) Inventors: Jogesh Chandran, Sandusky, OH (US); James A. Ehret, Norwalk, OH (US)

(73) Assignee: FMC Technologies, Inc., Houston, TX (US)

( * ) Notice: Subject to any disclaimer, the term of this patent is extended or adjusted under 35 U.S.C. 154(b) by 102 days.

(21) Appl. No.: 11/483,095

(22) Filed: Jul. 7, 2006

(65) Prior Publication Data

US 2007/0006741 A1      Jan. 11, 2007

Related U.S. Application Data

(60) Provisional application No. 60/697,812, filed on Jul. 8, 2005.

(51) Int. Cl.
   *B65G 15/48*      (2006.01)
(52) U.S. Cl. .................... 198/844.1; 99/443 C
(58) Field of Classification Search ............ 198/844.1, 198/848, 850, 851, 853; 99/443 C
   See application file for complete search history.

(56) References Cited

U.S. PATENT DOCUMENTS

| | | | | |
|---|---|---|---|---|
| 4,949,836 A | * | 8/1990 | Schostek | 198/676 |
| 5,439,751 A | * | 8/1995 | Fesler | 428/614 |
| 5,673,618 A | * | 10/1997 | Little | 100/145 |
| 5,743,376 A | * | 4/1998 | Ochs | 198/778 |
| 5,782,679 A | * | 7/1998 | Hunter | 451/296 |
| 6,319,308 B1 | | 11/2001 | McComas | |
| 6,782,650 B2 | | 8/2004 | McComas | |
| 2004/0229068 A1 | | 11/2004 | McComas | |
| 2005/0211105 A1 | * | 9/2005 | Hanson | 99/422 |

FOREIGN PATENT DOCUMENTS

EP         1 223 232       7/2002
WO     WO 99/58741      11/1999

* cited by examiner

*Primary Examiner*—Mark A. Deuble
(74) *Attorney, Agent, or Firm*—Pauley Peterson & Erickson

(57) ABSTRACT

A conveyor belt for use in the food processing industry includes a stainless steel substrate and nickel-boron coating material. The nickel-boron coating is applied on at least a portion of the stainless steel substrate to increase wear resistance.

20 Claims, 2 Drawing Sheets

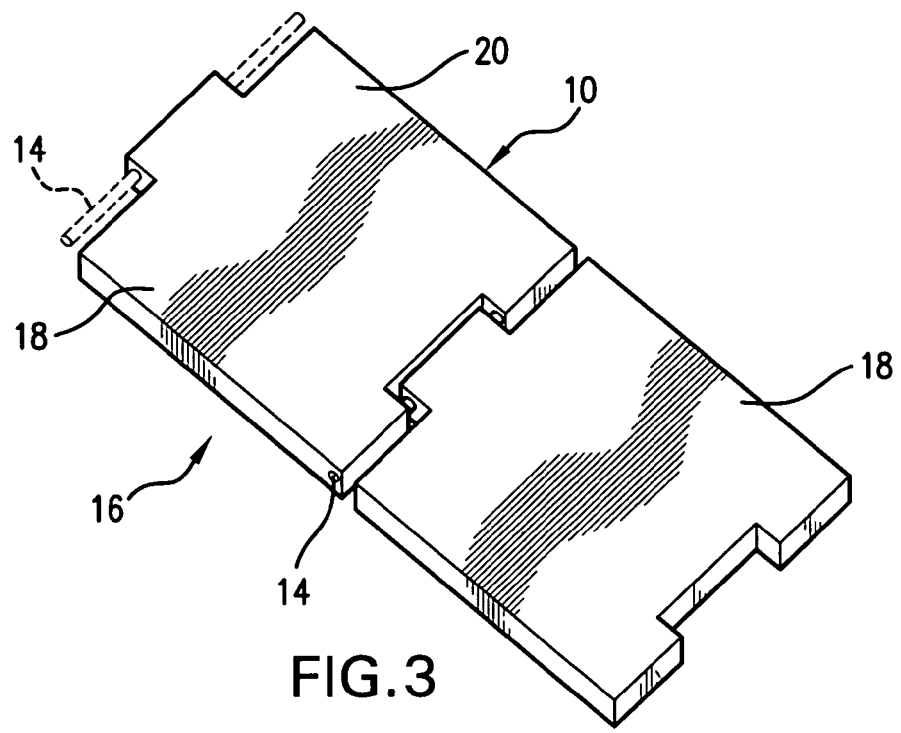
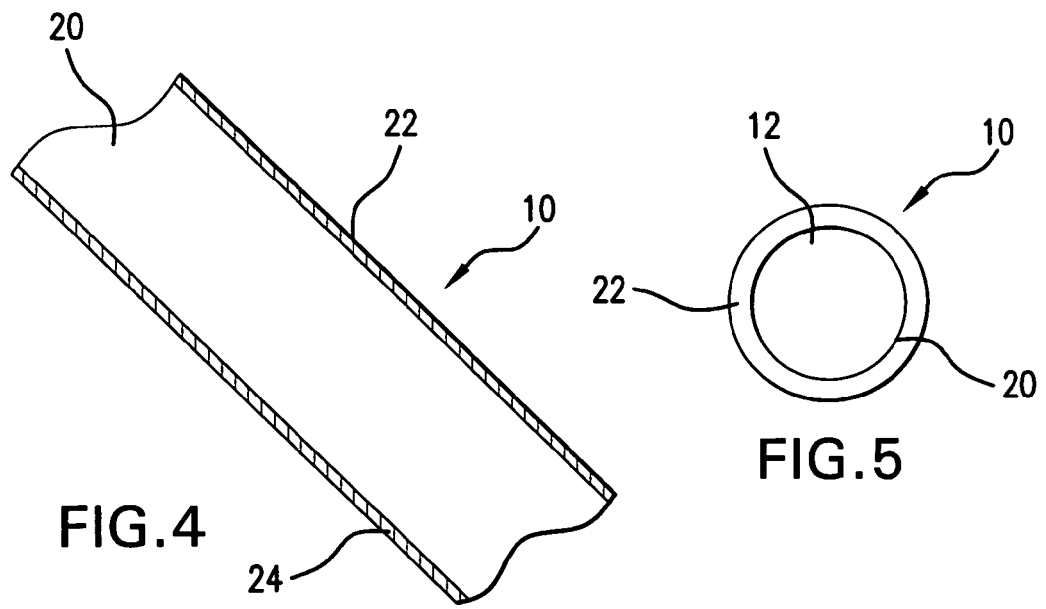

BORON COATED STAINLESS STEEL WIRE BELT ASSEMBLY

This application claims the benefit of U.S. Provisional Application 60/697,812 filed on 8 Jul. 2005.

FIELD OF THE INVENTION

The invention relates to an improved stainless steel conveyor belt for use in the food processing industry that is wear-resistant.

BACKGROUND OF THE INVENTION

Continuous conveyors, such as conveyor belts or wire belt assemblies, are used in many applications in the food industry to convey and support food during the manufacturing process. Stainless steel is commonly utilized to manufacture such continuous conveyors. The use of stainless steel is desirable due to its compliance with United States Department of Agriculture (USDA) cleaning requirements and its mechanical properties.

Conveyor belts may be manufactured using a variety of methods. Each of the different belt construction methods is generally utilized for a specific food manufacturing process. Selection of the method used to form the wire belt assembly depends upon various factors such as, the type and texture of the food item to be conveyed, the overall belt width, the length of the continuous belt and system requirements such as, for example, winding the belt around a drum.

Stainless steel conveyor belts are typically the number one wear component in a food processing plant in terms of both purchase costs and unexpected machine down time. Because belts are often hundreds of feet in length, inspection of each section of the belt on a regular basis for wear or fatigue is generally impractical. Lack of or irregular inspection, however, may result in unexpected and/or costly belt failures in the midst of a production run.

Belt wear life may be increased by making the belts out of heavier material components. However, in many applications increasing the belt weight is undesirable and/or impractical. Alternatively, belt components may be manufactured from specialized grades of stainless steel that have a higher tensile strength thereby providing improved wear life. However, use of such materials is often cost prohibitive.

SUMMARY OF THE INVENTION

Therefore, it is one feature of this invention to provide a conveyor belt for use in the food processing industry having improved resistance to wear and an increased wear life.

It is further feature of this invention to provide a conveyor belt for use in the food processing industry having improved wear resistance without significant increase in component weight.

Another feature of this invention is to provide a conveyor belt for use in the food processing industry having improved wear resistance that is economical to manufacture and utilize.

These features characterize, at least in part, a conveyor belt for use in the food processing industry that includes a stainless steel substrate and a nickel-boron coating applied on at least a portion of the stainless steel substrate to increase wear resistance.

In another embodiment, a conveyor belt for use in the food processing industry includes a plurality of individual stainless steel wires interconnected to form a continuous belt and a nickel-boron coating material. The nickel-boron coating material may be applied on the wires before they are interconnected.

In a further embodiment, a conveyor belt for use in the food processing industry includes a stainless steel substrate including a plurality of individual wires interconnected to form a continuous belt and a nickel-boron coating material. The nickel-boron coating material may be applied on select areas on a surface of the continuous belt after the wires are interconnected.

As used herein, the term "Knoop Hardness" refers to hardness values generated by the Knoop hardness test. The Knoop hardness test is applicable to extremely thin metal, plated surfaces, exceptionally hard and brittle materials, very shallow carburized or nitrided surfaces, or wherever the applied load must be kept below 3600 grams. The Knoop hardness number equals the load in kilograms placed on a diamond indentor ground to an elongated pyramidal form divided by the projected area of indentation in square millimeters. The load, which may be varied from 25 to 3600 grams, is applied for a definite period and always normal to the surface tested. The term "$HK_{25}$" refers to the Knoop hardness measured at a load of 25 grams. The higher the Knoop hardness the harder the material. Standard Knoop hardness test methods are defined in ASTM-E384.

Other features and advantages of the invention will be apparent to those skilled in the art from the following detailed description take in conjunction with the appended claims.

BRIEF DESCRIPTION OF THE DRAWINGS

FIG. 3 is a fragmentary plan view of a conveyor belt including a plurality of plates interconnected with through rods.

FIG. 4 is a fragmentary plan view of a conveyor belt including a nickel-boron coating applied on select wear spots.

FIG. 5 is a cross sectional view of a coated wire.

DETAILED DESCRIPTION OF THE INVENTION

One factor common among the various stainless steel belt designs is wear. Over time, the belts develop weakened or fatigued areas that may fail causing damage to or breakage of the belt and/or surrounding equipment. Each belt design develops specific wear points. The wear points may result from wearing against the belt support structure, wearing against internal belt load points in an effort to adjust the tension on the belt, wear points designed to drive the belt and wear points designed to change the angle and/or orientation of the belt during conveyor operation. Each of these wear points define the life of the belt.

The conveyor belts or wire belt assemblies of the present invention include a stainless steel substrate 10 and a nickel-boron coating material 22. The nickel-boron coating material may be applied on at least a portion of the stainless steel substrate to reduce wear and to extend the wear life of the conveyor belt.

Figure 1:
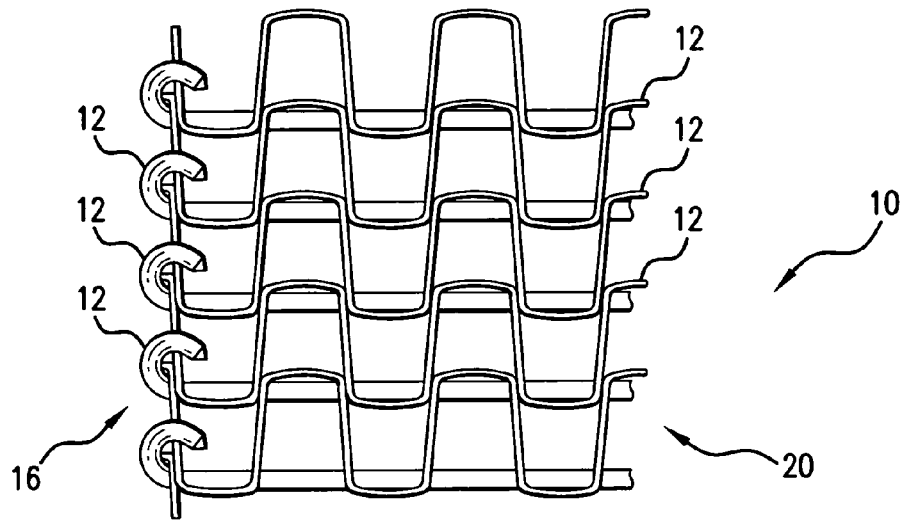
FIG. 1 is a fragmentary plan view of a conveyor belt including a plurality of interconnected wires.
Figure 2:
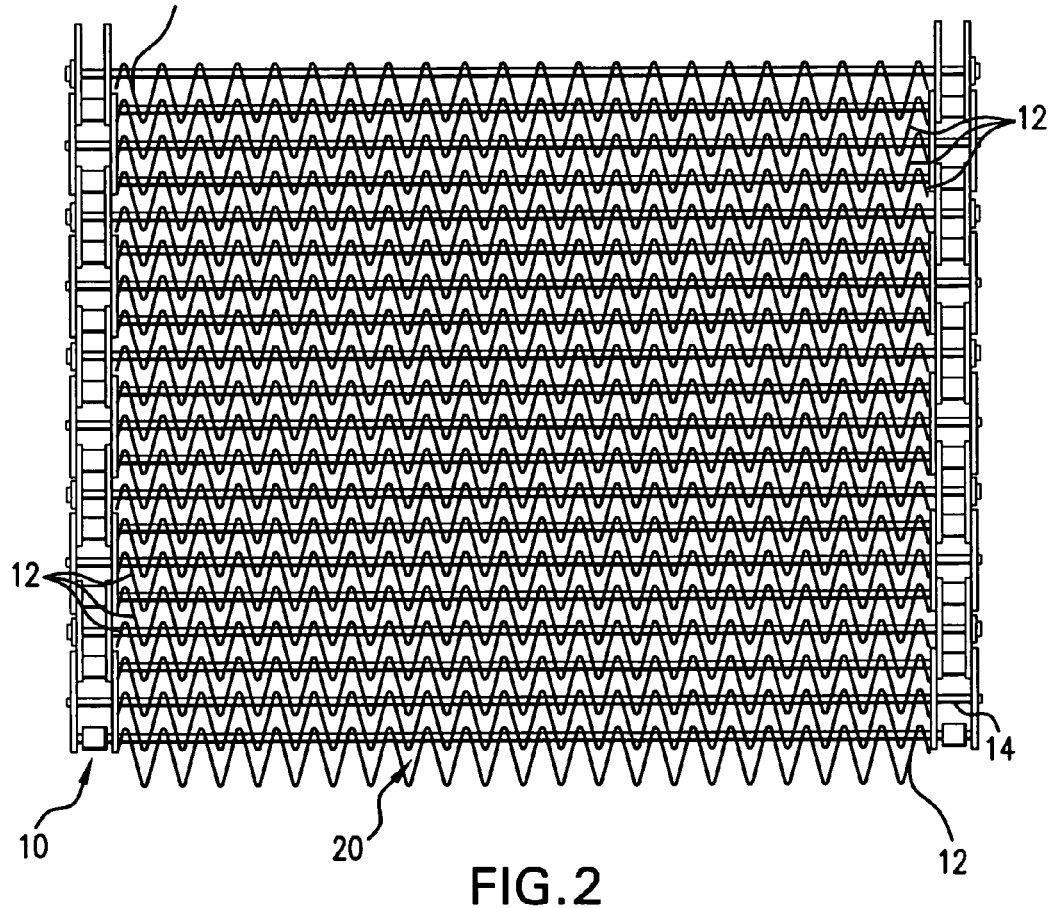
FIG. 2 is a fragmentary plan view of a conveyor belt including a plurality of wires interconnected with through rods.

Referring to FIGS. 1-3, the stainless steel substrate 10 may be in the form of a continuous belt 16. Suitably, the stainless steel substrate may include a plurality of stainless steel wires 12 interconnected to form a continuous belt 16 as shown in FIG. 1. Alternatively, the stainless steel substrate 10 may include a plurality of stainless steel wires 12 that are interconnected by one or more through rod assemblies 14 to form a continuous belt 16 as shown in FIG. 2. In another embodiment, shown in FIG. 3, the stainless steel substrate 10 may include a plurality of stainless steel plates 18 that are interconnected with a plurality of through rods 14 to form a continuous belt 16.

Nickel-boron coating materials are particularly suitable for use in food processing applications due to their durability and USDA approval. The nickel-boron coating material may generally be in the form of a nickel-boron metal alloy. Suitably, the nickel-boron coating material includes about 0.5 to about 10 weight percent boron or about 2 to about 7 weight percent boron or about 5 to about 6 weight percent boron or about 20 to about 25 atomic weight percent boron.

One particular advantage of nickel-boron coating materials is that they may be used to form a very hard, uniform surface on a stainless steel substrate without affecting the ductility of the stainless steel. Suitably, the nickel-boron coating may have a surface hardness of at least about 80 on the Rockwell C-Scale (Rc). Advantageously, the nickel-boron coating material may have a Knoop Hardness of about 1000 to about 1100 $HK_{25}$ as plated.

Suitably, the nickel-boron coated substrate may be heat treated at a temperature of about 420° to about 720° F. (about 215° to about 380° C.) for about 10 to about 180 minutes or, advantageously, for about 90 minutes to increase the hardness of the coating material. Heat treatment of the nickel-boron coating material may enhance the formation of nickel-boride crystalline clusters throughout the coating which contribute to increased hardness and wear resistance. The nickel-boron coating material may have a Knoop Hardness of about 1350 to about 1450 $HK_{25}$ following heat treatment.

Nickel-boron coating materials may advantageously form a uniform surface when applied to a substrate. In particular, when a nickel-boron coating material is applied to a stainless steel substrate, the coating may fill surface voids which are naturally inherent on the stainless steel substrate thereby providing nearly complete uniformity, i.e., about 100% coverage, of the substrate surface. Such surface uniformity results in a reduced coefficient of friction on wear surfaces. Surface uniformity of the coating may also enhance the ability to clean and maintain the conveyor belt. Suitably, the nickel-boron coating material may have a coefficient of friction of about 0.08. A standard method for determining the coefficient of friction of the coating material is defined in ASTM-D2714.

The nickel-boron coating may have a thickness of about 2 to about 400 microns; suitably about 10 to about 250 microns; and advantageously about 25 to about 50 microns. Coating density may be in the range of about 8.2 to about 9.6 grams per cubic centimeter.

The nickel-boron coating material may have a nodular surface topography and/or may include particles. Suitable particles include hard particles, such as diamond or boron carbide, to increase wear resistance and/or lubricant particles, such as molly disulfide, to provide lubricious properties. Suitably, the particles have a particle size of less than about 10 microns and, advantageously, less than about 1 micron.

Suitably, the nickel-boron coating material 22 may be applied on at least one surface 20 of the stainless steel substrate 10 before assembly into a continuous belt 16. Alternatively the nickel-boron coating material 22 may be applied on at least one surface 20 of the stainless steel substrate 10 after assembly into a continuous belt 16.

Referring to FIGS. 4 and 5, the nickel-boron coating material 22 may be applied on substantially all surfaces 20 of the stainless steel substrate 10 or may be applied on select wear spots 24 on at least one surface 20 of the stainless steel substrate 10. Suitably, the nickel-boron coating material 22 may be applied on at least about 10 to about 90 percent or at least about 20 to about 80 percent or at least about 30 to about 70 percent of at least one surface 20 of the stainless steel substrate 10. Alternatively, the nickel-boron coating material 22 may be applied on greater than about 25 percent or greater than about 50 percent or greater about 75 percent or greater than 90 percent of at least one surface 20 of the stainless steel substrate 10.

In embodiments wherein the stainless steel substrate includes a plurality of individual stainless steel wires, the wires may be partially or completed coated prior to or after assembly into a continuous belt.

Suitably, the nickel-boron coating material may be applied on one or more surfaces of the stainless steel substrate by any means known in the art. Advantageously, the nickel-boron coating material may be applied by an electroless deposition process wherein the catalytically active surface of the stainless steel substrate causes a reduction of nickel metal ions in a plating bath by borohydride which thereby results in the deposition of a nickel-boron metal alloy on the surface of the substrate. Electroless nickel-boron coatings may be advantageously utilized due to their hardness, wear resistance, abrasive properties and ductility.

More particularly, the nickel-boron coating may be made by contacting the stainless steel substrate with a coating bath containing nickel ions, a metal ion complexing agent, a stabilizer, and a borohydride reducing agent at a pH about 10 to about 14 and at an elevated temperature of about 180° to about 200° F. (about 82° to about 93° C.). The coating may be plated at lower temperature after the plating has been initiated within a temperature range of about 180° to about 200° F.

Any conventional nickel plating bath for electroless deposition using borohydride reducing agent can be used for co-deposition of nickel-boron. The nickel plating bath may include nickel ions, a chemical agent for adjusting the pH of the bath to between about 10 and about 14, a metal ion complexing agent, a borohydride reducing agent and a stabilizer.

The nickel ions in the coating bath may be prepared using water soluble nickel salts. Suitable water soluble nickels salts include nickel chlorides, sulfates, formates, acetates, other salts whose anions are substantially inert with respect to other bath components, and combinations thereof. The plating bath suitably contains about 0.175 to about 2.10 moles per gallon of plating bath nickel ions or about 0.35 to about 1.57 moles per gallon nickel ions (about 0.05 to about 0.55 moles/liter or about 0.9 to about 0.41 moles/liter).

The coating bath is suitably prepared to have a pH of about 12 to about 14 and, advantageously, about 13.5. Adjustment of the pH may be accomplished by the addition of a wide variety of alkaline salts or solutions thereof such as, for example, sodium, potassium and/or ammonium hydroxide. Ammonium hydroxide offers additional advantages in that ammonium ions may function to assist metal ion complexing in the coating bath.

A metal ion complexing agent is added to the bath to inhibit and/or prevent precipitation of the metal ions such as nickel. Suitable metal ion complexing agents include, but are not limited to, ethylenediamine, diethylene triamine, triethylene tetramine, oxalic acid, citric acid, tartaric acid, ethylene diamine tetracetic acid and the water soluble salts thereof, and combinations thereof. The plating bath may include about 2.26 to about 6.795 moles per gallon of plating bath of a metal ion complexing agent or about 3.3 to about 3.8 moles per gallon metal ion complexing agent (about 0.60 to about 1.80 moles/liter or about 0.87 to about 1.0 moles/liter).

The borohydride reducing agent can be selected from among known borohydrides having a good degree of water solubility and stability in aqueous solutions. Suitable borohydrides include sodium borohydride [$NaBH_3$], substituted borohydrides in which not more than three of the hydrogen atoms have been replaced, such as, for example, sodium trimethoxyborohydride [$NaB(OCH_3)_3H$], and combinations thereof. The plating bath suitably includes about 0.03 to about 0.1 moles per gallon of plating bath borohydride reducing agent, based on $BH_4$, or about 0.045 to about 0.08 moles per gallon borohydride reducing agent (about 0.008 to about 0.026 moles/liter or about 0.012 to about 0.021 moles/liter).

The stabilizer is usually added to the bath from a concentrate. Examples of suitable stabilizers include lead tungstate, lead sulfate tungstate, lead chloride tungstate or combinations thereof. The stabilizer may be present in the plating bath in an amount up to about 6% by volume of the plating bath.

The coating bath is typically prepared by forming an aqueous solution of an appropriate amount of the nickel salt(s), adding a metal ion complexing agent and a stabilizer, adjusting the pH to about 12 to about 14, heating the bath to about 195° F. (about 90° C.), filtering the heated bath solution and adding a desired amount of borohydride reducing agent, typically as an alkaline solution, immediately before introducing a substrate to be coated.

The substrate to be coated may be prepared by mechanical cleaning, degreasing, anode-alkaline cleaning and/or pickling in an acid bath in accordance with standard practice in the plating industry. The substrate may be masked if desired to allow deposition of the nickel-boron coating only on select surfaces or on select areas on a surface. In instances where coating adhesion is critical, coating adhesion may be enhanced by electrochemically depositing a nickel strike on the substrate prior to applying the nickel-boron coating.

The prepared substrate is coated by immersion into the hot (about 180° to about 200° F.) coating bath to initiate the coating process. The process is continued until deposition of the coating has progressed to the desired thickness or until the metal ions are depleted from the bath solution. Deposition rates may range from about 0.1 mil per hour to about 1.5 mil per hour. Suitably, the deposition rate may be about 1 mil per hour.

Additional method details for electroless nickel-boron coating may be found in U.S. Pat. Nos. 6,319,308 and 6,782,650 to McComas, the disclosures of which are hereby incorporated by reference.

While in the foregoing specification this invention has been described in relation to certain preferred embodiments thereof, and many details have been set forth for purposes of illustration, it will be apparent to those skilled in the art that this invention is susceptible to additional embodiments and that certain of the details described herein can be varied considerably without departing from the basic principles of the invention.

We claim:

1. A conveyor belt for use in the food processing industry comprising:
   a stainless steel substrate; and
   a nickel-boron coating material,
   wherein the nickel-boron coating material is applied on at least a portion of the stainless steel substrate to increase wear resistance.

2. The conveyor belt of claim 1, wherein the stainless steel substrate comprises a plurality of wires interconnected to form a continuous belt.

3. The conveyor belt of claim 1, wherein the stainless steel substrate comprises a plurality of wires interconnected with at least one through rod assembly to form a continuous belt.

4. The conveyor belt of claim 1, wherein the stainless steel substrate comprises a plurality of plates interconnected with a plurality of through rods to form a continuous belt.

5. The conveyor belt of claim 1, wherein the nickel-boron coating is applied on at least one surface of the stainless steel substrate before assembly into a continuous belt.

6. The conveyor belt of claim 1, wherein the nickel-boron coating is applied on at least one surface of the stainless steel substrate after assembly into a continuous belt.

7. The conveyor belt of claim 1, wherein the nickel-boron coating is applied on select wear spots on at least one surface of the stainless steel substrate.

8. The conveyor belt of claim 1, wherein the nickel-boron coating is applied on substantially all surfaces of the stainless steel substrate.

9. The conveyor belt of claim 1, wherein the nickel-boron coating has a Knoop Hardness of about 1000 to about 1100 $HK_{25}$.

10. A conveyor belt for use in the food processing industry comprising:
    a plurality of individual stainless steel wires interconnected to form a continuous belt; and
    a nickel-boron coating material,
    wherein the nickel-boron coating is applied on the wires before they are interconnected.

11. The conveyor belt of claim 10, wherein the wires are partially coated.

12. The conveyor belt of claim 10, wherein the wires are completely coated.

13. The conveyor belt of claim 10, wherein the nickel-boron coating material has a thickness of about 10 to about 250 microns.

14. The conveyor belt of claim 10, wherein the nickel-boron coating material is heat-treated to a Knoop Hardness of about 1350 to about 1450 $HK_{25}$.

15. A conveyor belt for use in the food processing industry comprising:
    a stainless steel substrate including a plurality of individual wires interconnected to form a continuous belt; and
    a nickel-boron coating material,
    wherein the nickel-boron coating material is applied to select areas on a surface of the continuous belt after the wires are interconnected.

16. The conveyor belt of claim 15, wherein the nickel-boron coating material is applied on select wear spots on a surface of the continuous belt.

17. The conveyor belt of claim 15, wherein nickel-boron coating material has a coating density of about 8.2 to about 9.6 grams per cubic centimeter.

18. The conveyor belt of claim 15, wherein the nickel-boron coating material has a nodular surface topography.

19. The conveyor belt of claim 15, wherein the nickel-boron coating material further comprises particles.

20. The conveyor belt of claim 19, wherein the particles have a particle size of less than about 10 microns.

* * * * *